(12) United States Patent
Ahmed et al.

(10) Patent No.: US 6,816,460 B1
(45) Date of Patent: Nov. 9, 2004

(54) LOCATION BASED ROUTING FOR MOBILE AD-HOC NETWORKS

(75) Inventors: Walid Ahmed, Eatontown, NJ (US); Hong Jiang, Westfield, NJ (US); Muralidharan Sampath Kodialam, Marlboro, NJ (US); Pantelis Monogioudis, Edison, NJ (US); Kiran M Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/525,735

(22) Filed: Mar. 14, 2000

(51) Int. Cl.[7] ............................................. H04L 12/26
(52) U.S. Cl. ..................................... 370/238; 370/255
(58) Field of Search ............................... 370/254, 255, 370/236, 400, 410, 480, 491, 498, 500, 546, 461, 462, 331, 344, 338, 238, 238.1, 248; 455/403, 422, 432, 443, 899, 445, 411, 69; 709/238, 222

(56) References Cited

U.S. PATENT DOCUMENTS

| | | | |
|---|---|---|---|
| 5,253,248 A | | 10/1993 | Dravida et al. .............. 370/16 |
| 5,412,654 A | * | 5/1995 | Perkins ....................... 370/312 |
| 5,596,719 A | * | 1/1997 | Ramakrishnan et al. .... 709/241 |
| 5,610,904 A | * | 3/1997 | Eng et al. .................... 370/408 |
| 5,652,751 A | * | 7/1997 | Sharony ....................... 370/227 |
| 5,737,318 A | * | 4/1998 | Melnik ........................ 370/254 |
| 5,959,568 A | | 9/1999 | Woolley ....................... 342/42 |
| 5,987,011 A | * | 11/1999 | Toh ............................. 370/331 |
| 6,046,978 A | * | 4/2000 | Melnik ........................ 370/221 |
| 6,304,556 B1 | * | 10/2001 | Haas ............................ 370/254 |
| 6,307,843 B1 | * | 10/2001 | Okanoue ...................... 370/312 |
| 6,366,560 B1 | * | 4/2002 | Ohiwane et al. ............. 370/238 |
| 6,456,599 B1 | * | 9/2002 | Elliott ......................... 370/254 |
| 6,535,498 B1 | * | 3/2003 | Larsson et al. .............. 370/338 |

OTHER PUBLICATIONS

Camara, Daniel et al., "A Novel Routing Algorithm for Ad Hoc Networks", Proceedings of the Hawaii International Conference.*
Basagni, Stefano et al., "A Distance Routing Algorithm for Mobility", Erik Johnson School of Engineering University of Texas, Mobicom, 1998.*
Amouris, K. N. et al., "A Position–Based Multi–Zone Routing Protocol for Wide Area Mobile Ad–Hoc Networks", Houston, Tx, May 16–20, 1999, New York, IEEE.*
S. Corson, J. Macker, "Mobile Ad hoc Networking (MANET): Routing Protocol Performance Issues and Evaluation Considerations", RFC 2501, The Internet Society, Jan. 1999.
Z. J. Haas, M. R. Pearlman, The Zone Routing Protocol (ZRP) for AD Hoc Networks, IETF internet draft, Nov. 1997.
J. Broch, D. B. Johnson, D. A. Maltz, "The Dynamic Source Routing Protocol for Mobile Ad Hoc Networks", IETF internet draft, Oct. 1999.

(List continued on next page.)

*Primary Examiner*—Kwang Bin Yao (57) ABSTRACT

In an ad-hoc mobile network, a geometry-based routing algorithm (GRA) is used to route traffic from a source node to a destination node. In the GRA, a source node maintains location information and routing information for all nodes in a local area and approximate location information for at least some nodes outside the local area. If the source node has to send a packet to a destination node outside their local area, then the source node uses the approximate location information of the destination node to identify which node in its local area is closer to the destination node than the source node. The source node then sends the packet to the identified local node for further routing.

18 Claims, 11 Drawing Sheets

OTHER PUBLICATIONS

D. Camara et al, "A Novel Routing Algorithm For Ad Hoc Networks", *Proceedings of HICSS33: Hawaii International Conference on System Sciences*, vol. 2, Jan. 4–7, 2000, pp. 1–8, Maui, Hawaii.

S. Basagni et al, "A Distance Routing Effect Algorithm For Mobility (DREAM)", Dallas, TX, Oct. 25–30, 1998, New York, New York: *ACM, US*, Oct. 25, 1998, pp. 76–84.

Jerzy et al, "Relative Neighborhood Graphs and Their Relatives", *Proceedings of the IEEE*, vol. 80, No. 9, Sep. 9, 1992, pp 1502–1517.

Amouris, K. N., et al: "A Position–Based Multi–Zone Routing Protocol for Wide Area Mobile Ad–Hoc Networks", Houston, TX, May 16–20, 1999, New York, NY: IEEE, US, vol. CONF. 49, May 16, 1999, pp. 1365–1369; p. 1365, col. 2, paragraph 3; p. 1366, col 1, line 5 "The choice of link–state CRP is arbitrary." p. 1366, col 2, line 28–line 34; p. 1367, col 1, line 12–line 17, step 1, Step 2, p. 1367, col 2.

Rahul Jain, Anuj Puri, Raja Sengupta: "Geographical Routing Using Partial Information for Wireless Ad Hoc Networks", Internet, "Online!" 20 De. 1999, retrieved from the Internet: <URL:http://citeseer.nj.nec.com/336698.htm1> retrieved on Apr. 2, 2001, p. 4, paragraph 4.1–p. 5, p. 6, paragraph 4.1.2.

* cited by examiner

Local Topology Table
$[S^2(105)]$

| Destination Node in Local Topology | Next Hop Node in Local Topology | Number of Hops |
|---|---|---|
| node 110 | node 110 | 1 |
| node 115 | node 110 | 2 |
| node 120 | node 110 | 2 |
| node 125 | node 130 | 2 |
| node 130 | node 130 | 1 |
| node 135 | node 130 | 2 |
| node 140 | node 130 | 2 |
| node 145 | node 145 | 1 |
| node 150 | node 145 | 2 |

FIG. 3

Location Table

| Node | Location |
|---|---|
| node 105 | l(105) |
| node 110 | l(110) |
| node 115 | l(115) |
| node 120 | l(120) |
| node 125 | l(125) |
| node 130 | l(130) |
| node 135 | l(135) |
| node 140 | l(140) |
| ... | ... |
| node 205 | l(205) |

Routing Table

| Destination Node | Next Hop Node in Local Topology |
|---|---|
| node 110 | node 110 |
| node 115 | node 110 |
| node 120 | node 110 |
| node 125 | node 130 |
| node 130 | node 130 |
| node 135 | node 130 |
| node 140 | node 130 |
| node 145 | node 145 |
| node 150 | node 145 |
| ... | ... |
| node 205 | node 130 |

Direct Neighbor Table

| node 110 |
| node 130 |
| node 145 |

FIG. 9

Location Table

| Node | Location | Time Stamp |
|---|---|---|
| node 105 | p(105, 105) | s(105, 105) |
| node 110 | p(105, 110) | s(105, 110) |
| node 115 | p(105, 115) | s(105, 115) |
| node 120 | p(105, 120) | s(105, 120) |
| node 125 | p(105, 125) | s(105, 125) |
| node 130 | p(105, 130) | s(105, 130) |
| node 135 | p(105, 135) | s(105, 135) |
| node 140 | p(105, 140) | s(105, 140) |
| ... | ... | ... |
| node 205 | p(105, 205) | s(105, 205) |

FIG. 11

LOCATION BASED ROUTING FOR MOBILE AD-HOC NETWORKS

This invention was made with Government support under contract DAAB07-98C-D009. The Government has certain rights in this invention.

CROSS-REFERENCE TO RELATED APPLICATIONS

Related subject matter is disclosed in the co-pending, commonly assigned, U.S. Patent application of Ahmed et al., entitled "A Topology Sensing Scheme for Networks with Mobile Nodes," Application No. 09/513,325, filed on Feb. 25, 2000.

FIELD OF THE INVENTION

This invention relates generally to communications and, more particularly, to wireless systems.

BACKGROUND OF THE INVENTION

An "ad-hoc" mobile network (ad-hoc network) is a wireless network that comprises a collection of nodes whose positions are continually changing. Unlike a regular wireless network, one can view an ad-hoc network as a network with no fixed infrastructure. For example, all the nodes function as routers and perhaps as base stations; and the mobility of the nodes causes frequent changes in network topology.

It is the varying network topology of an ad-hoc network that causes difficulty in applying routing techniques used in a conventional wireless network. In the latter, the nodes in the network are stationary and the links connecting the nodes go down infrequently. As such, it is possible to maintain the whole network topology at each node by sending topology-related information to all the nodes in the network via, what is known in the art as, "link-state," updates. Since nodes go down infrequently—link-state updates are infrequent—and this approach works quite well in a conventional wireless network. However, in an ad-hoc network link-state changes are more frequent because of the shifting topology, thus generating many more link-state update messages throughout the ad-hoc network—and consuming valuable bandwidth in the process. Also, construction of consistent routing tables is difficult because of the delay involved in propagating link-state information.

Considering these factors, routing protocols for ad-hoc networks can be classified broadly into two categories: "table-driven" and "source initiated on-demand." Table-driven routing protocols are similar to the above-mentioned conventional wireless routing approach, i.e., each node attempts to maintain consistent, up-to-date, routing information for all other nodes in the network. Examples of table driven routing protocols are "Destination-Sequenced-Distance-Vector" (DSDV), "Clusterhead Gateway Switch Routing" (CGSR), and the "Wireless Routing Protocol" (WRP) protocols. In contrast, source initiated on-demand routing protocols create routing information only when a source node needs a route to a given destination. Examples of source initiated on-demand routing protocols include "Ad-Hoc On-Demand Distance Vector" (AODV), "Dynamic Source Routing" (DSR), "Temporally Ordered Routing Algorithm" (TORA), and the "Zone Routing Protocol" (ZRP) protocol.

As an illustration of a source initiated on-demand protocol consider ZRP. In ZRP, each node maintains the whole network topology for a local area, or zone, around it. As such, if the node (i.e., the source node) has to send a packet to a destination address in the zone, that routing information is already available. However, if the source node has to send a packet to a destination address outside their zone, then the node initiates a query to all the nodes in the edge of its zone (i.e., edge nodes). If one of these edge nodes has the routing information for the destination address, then that routing information is passed on back to the source node.

SUMMARY OF THE INVENTION

We have observed that the above-mentioned forms of ad-hoc network routing protocols generally require a node maintaining accurate information, in one form or another, about how to route to a node in regions that are far away from it. As such, if the number of nodes is large and spread over a large geographical area, and if there is reasonable mobility of the nodes, getting this information becomes difficult—if not impractical. Therefore, and in accordance with the invention, a source node uses a geometry-based routing protocol (GRP) to route traffic to a destination node. In the GRP, a source node routes a packet to a destination node outside of its local node topology (referred to herein as the local topology) as a function of the distance to the destination node.

In an embodiment of the invention, a source node maintains location information and routing information for all nodes in a local area, or local topology, and at least approximate location information for at least some nodes outside the local area. If the source node has to send a packet to a destination node in their local area, that routing information is already available. However, if the source node has to send a packet to a destination node outside their local area, then the source node uses the approximate location information of the destination node to identify which node in the local area is closest to the destination node in the local topology. If the identified local node is different from the source node, the latter transmits the packet to the identified local node, which then attempts to route the packet to the destination node. Otherwise, the packet is dropped.

DETAILED DESCRIPTION

Figure 1:
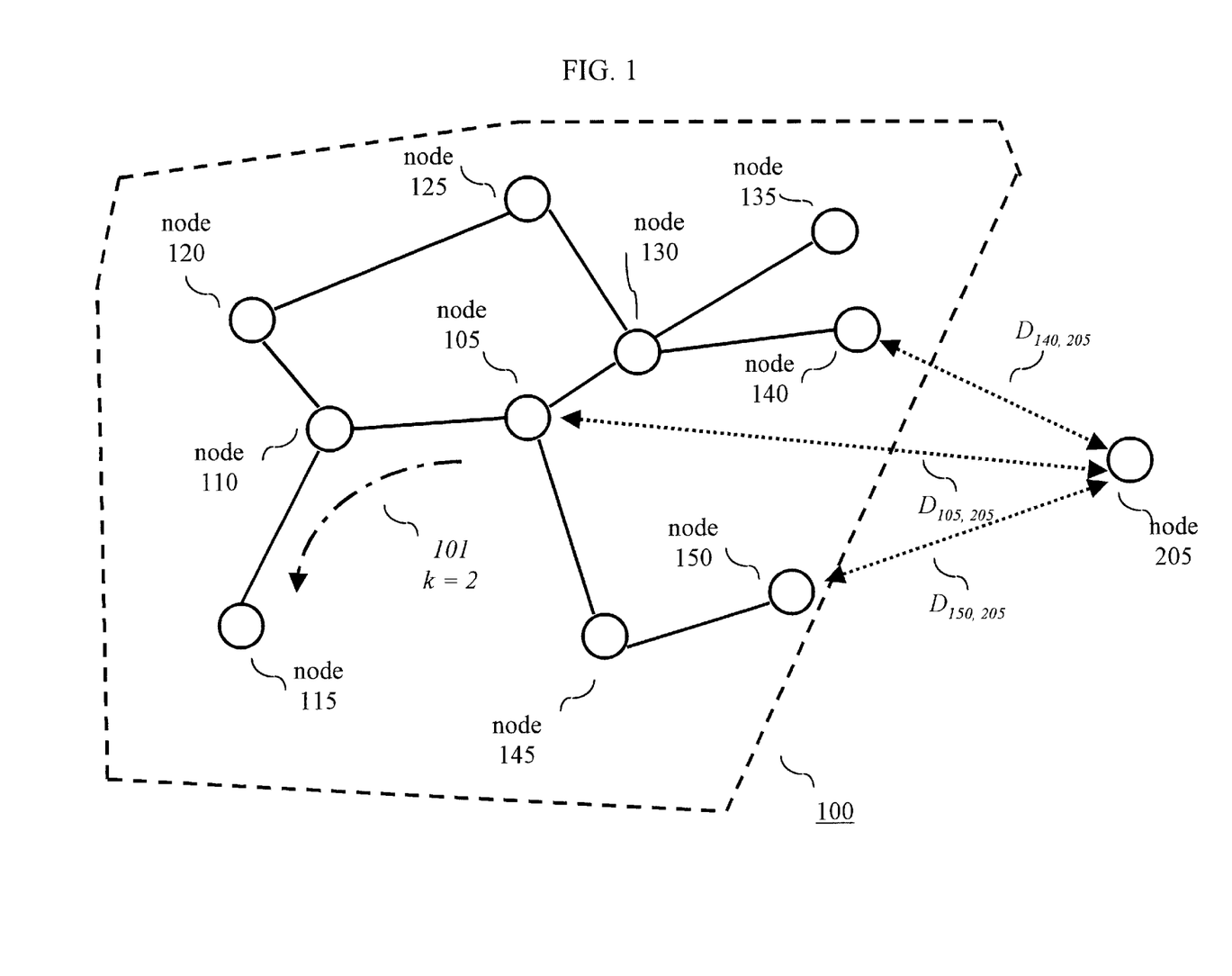
FIG. 1 shows a portion of an ad-hoc network embodying the principles of the invention.

A portion of an illustrative ad-hoc network embodying the principles of the invention is shown in FIG. 1. Other than the inventive concept, the elements shown in FIG. 1 are well-known and will not be described in detail. For example, node 105 includes stored-program-control processors, memory, and appropriate interface cards for wireless communications. (The exact form of wireless transmission used, e.g., the use of carrier-division multiple access (CDMA), is not relevant to the inventive concept and, as such, is not described herein.) For the purposes of this example, it is assumed that each node of the ad-hoc network refers to a mobile device that allows users (mobile user stations, terminals, etc. (not shown)) to access the ad-hoc network and also provides routing functions for packets/data traversing the network. Each node transmits an omnidirectional pilot signal and is capable of communicating with other nodes using a signaling protocol to transfer information, such as the earlier-mentioned link-state information, between nodes. (Pilots and signaling protocols are known in the art and, as such, are not described herein.) The omnidirectional antenna and pilot signal are part of a topology sensing scheme (referred to further below) which enables nodes to sense the presence of one another and also to exchange some information useful for making link setup decisions. In general, and other than the below-described inventive concept, the nodes use this information to decide which of their neighboring nodes they should have direct (point-to-point) links with and then proceed to establish these links. The point-to-point links are preferably supported by directional antennas.

For the sake of simplicity it is assumed that all nodes with a transmission radius, r, of node 105 are capable of communicating with node 105.

At this point, the following definitions are made:

V—represents the set of all nodes in the ad-hoc network;

v, w, u, i, j—represent various nodes of the ad-hoc network;

r—transmission radius for a node, i.e., all nodes within the transmission radius are capable of communicating with that node;

N(v)—represents the local topology of a node, v;

$S^k(v)$—the k-neighborhood of a node v; i.e., a local topology of node v where all nodes are within k hops of node v;

$H_{vw}$—the minimum number of hops between a node v and a node w, where w∈N(v);

$N_{vw}$—the next hop node from a node v to a node w, where ∈N(v);

l(v)—represents the location of a node v; and $D_{vw}$—represents the distance between two nodes, v and w; where $$D_{vw}=\|l(v)-l(w)\|. \quad (1)$$

It is assumed that each node further comprises global positioning system (GPS) equipment (not shown in FIG. 1), as known in the art, for determining its own location (in two dimensions) on the globe. In accordance with the invention, each node of the ad-hoc network implements a geometry-based routing protocol (GRP) (also referred to as a geometry-based routing algorithm (GRA) or position-based routing) such that:

(a) each node has its own defined local topology, (also referred to as a local network or a local neighborhood) (described further below) which may, or may not, be different than the local topologies of other nodes; and (b) each node stores location information (approximate or exact) of the nodes of the ad-hoc network (those nodes in the local topology and those nodes outside of, or distant from, the local topology).

In other words, in the GRP each node knows its local topology for a subset of nodes of the ad-hoc network (connectivity and location) and only location information for other, or distant, nodes of the ad-hoc network (i.e., connectivity is not known for these distant nodes). As will become apparent from the description below, the GRP is capable of implementation using conventional programming techniques, which, as such, will not be described herein.

Figure 2:
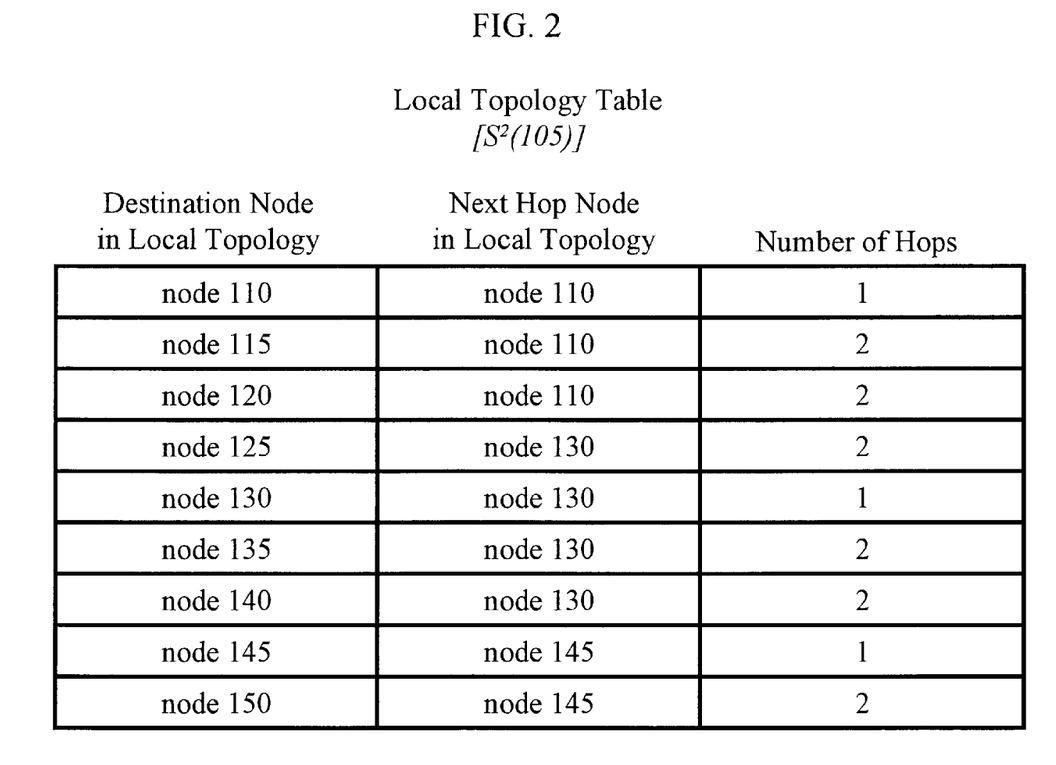
FIG. 2 shows an illustrative local topology table.
Figure 3:
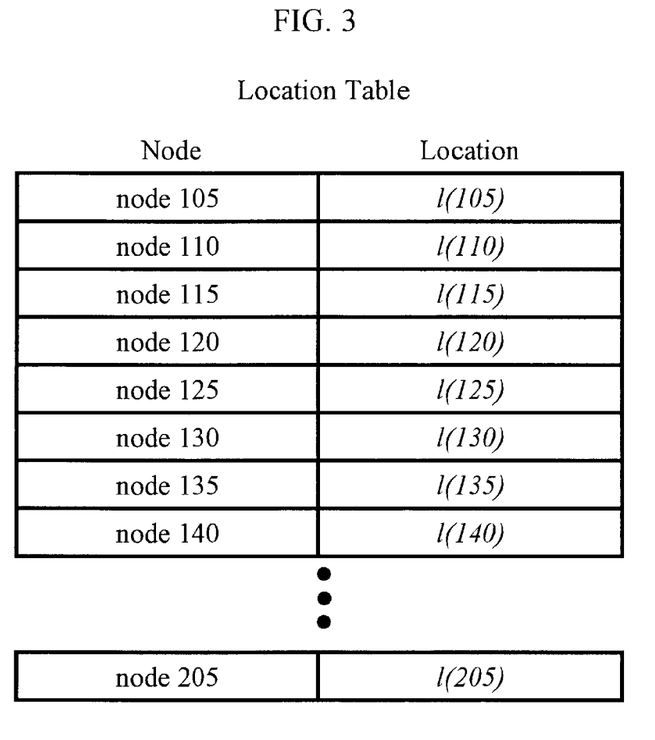
FIG. 3 shows an illustrative location table.

Illustratively, FIG. 1 shows a local topology 100 for node 105. As can be observed from FIG. 1, local topology 100 not only defines the nodes that are a part of local topology 100 but also how node 105 is connected to these nodes (i.e., a "network graph," or simply "graph"). It is assumed that all communications are bi-directional and hence the graph is undirected; and that local topology 100 is non-hierarchical. Illustratively, node 105 stores in memory (not shown) a local topology table (as illustrated in FIG. 2), which corresponds to local topology 100 and a location table (as illustrated in FIG. 3), which stores location information for nodes (including nodes outside the local topology). As defined above, local topology 100 is representative of a 2-neighborhood for node 105, i.e., $S^2(105)$, since all nodes of local topology 100 can be reached from node 105 in 2, or fewer, hops. As used herein, node 105 is the reference node for local topology 100.

As noted, the local topology table of FIG. 2 lists all the nodes currently in the local topology for node 105 and the connection between nodes. For example, if node 105 has a packet to transmit to node 115, node 105 transmits the packet to the next hop node, which is identified as node 110 from the local topology table. From this table, the total number of hops to get to node 115 is k=2. This is also illustrated in FIG. 1 by arrow 101. Creation of the local topology table is described further below.

Although node 105 is capable of communicating with all nodes within the transmission radius r, node 105 only communicates with nodes with which it has established point-to-point links (i.e., its direct neighbors). Similarly, other nodes only communicate with node 105 if node 105 is their direct neighbor. In other words, nodes are preferably connected as point-to-point wireless links that gives rise to a k-neighborhood for a node, which is referred to herein as the local topology for that node. (Also, as noted above, it is possible to use directional antennae and focused beams to communicate between the neighbors in the graph—thereby increasing the capacity of the system.)

Since each node has its own local topology and location information for nodes (including those outside it local topology), the GRA is defined as follows. Let t be the destination address (of a destination, or end, node) of a packet that arrives at a node v, which has a local topology, N(v). In accordance with the GRA, if t≠v, node v determines:

$$w = arg \min_{u \in S^k(v)} D_{ut}; \quad (2)$$

where node v forwards the packet to node $N_{vw}$ unless w=v (i.e., the reference node itself is the closest node) in which case the packet is dropped.

Using the GRA, the packet, in effect, migrates from local topology to local topology until reaching that local topology within which the end node resides.

In the context of FIG. 1, the GRA is illustrated as follows, and as is shown in the flow chart of FIG. 4. Assume that node 105 (the source node, v, of equation (2)) receives a packet (not shown) for transmission to node 205 (the end node, t, of equation (2)) in step 405 of FIG. 4. Node 105 searches its local topology table to see if node 205 is a part of its local topology in step 410. If it is, node 105 simply sends the packet to the next hop node identified in its local topology table in step 415. On the other hand if node 205 is not a part of the local topology for node 105, node 105 performs the geometry-based routing protocol in step 420 to identifying the closest node, in its local topology, to node 205. In particular, node 105 performs equation (2) for all nodes that are a part of its local topology 100. Node 105 evaluates the distance from node 205 to each node in its local topology 100 (using equation (1) and the location information from the location table shown in FIG. 3). This is illustrated in FIG. 1 by three dotted line arrows $D_{140, 205}$; $D_{105, 205}$; and $D_{150, 205}$, which correspond to the distance calculations of equation (1) between nodes 140 and 205, 105 and 205, and 150 and 205 (the other distance calculations for the remaining nodes of local topology 100 are not shown). Once the closest node is identified, node 105 sends the packet to that node of local topology 100 that has the minimum distance to node 205, e.g., here assumed to be node 140. Node 105 routes the packet to node 140 via the local topology table, in step 415 of FIG. 4 (i.e., the packet is sent to the next hop node 130 as indicated in the local topology table of FIG. 2). As should be readily apparent, the next hop node then performs the GRA using its local topology table. (Although not shown in the flow chart of FIG. 4, suitable error conditions can also be added to process the packet in certain situations. For example, if there is no location information for node 205 in the location table, the packet is dropped.)

In the application of the GRA within a local topology it is important to ensure that there are no "loops" in the routing. One possible cause of a loop in the GRA routing is the situation where two nodes are the same distance from the destination node. As such, an alternative to equation (2) is equation (3), below:

$$w = \arg\min_{u \in S^k(v)} D_{ut} + \varepsilon H_{vu}; \quad (3)$$

where it is assumed that $\varepsilon$ is a very small number. The implication of $\varepsilon$ is that if there are two nodes whose distance to the end node is the same, then the tie is broken in favor of the node that is closer to u in terms of hop count.

Figure 4:
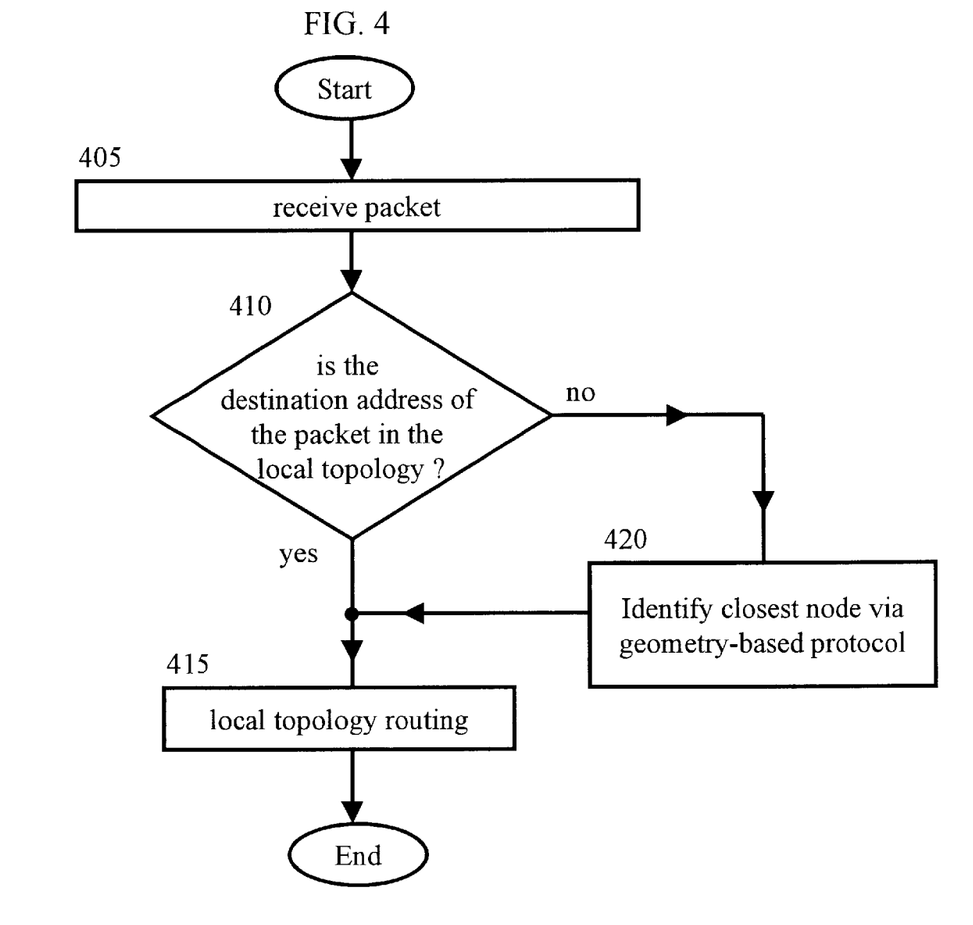
FIG. 4 shows an illustrative flow chart for use in routing a packet in an ad-hoc network.
Figure 5:
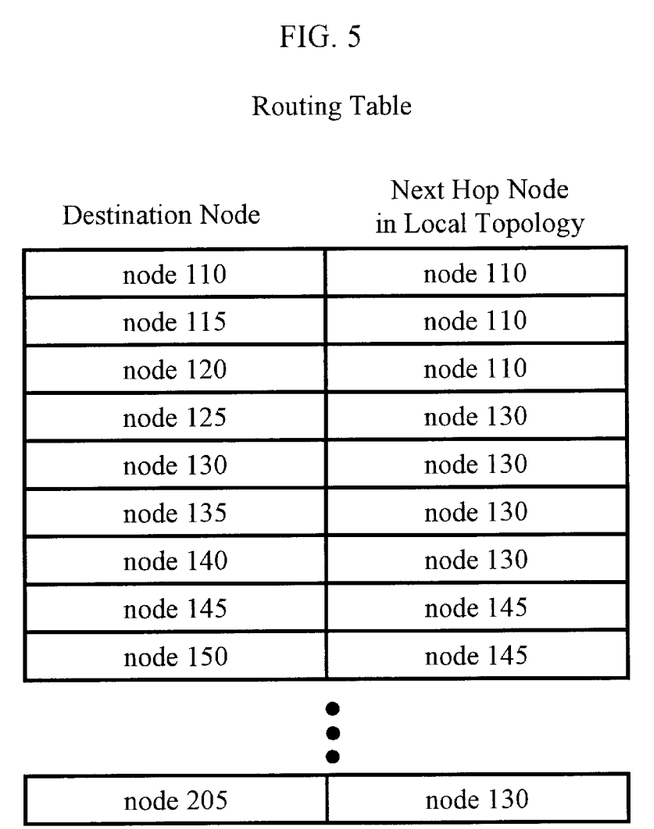
FIG. 5 shows an illustrative routing table.

Also, rather than making routing calculations on-the-fly as packets arrive at a node as illustrated in FIG. 4, a routing table can be constructed a priori using the calculations described earlier and packet routing decisions can be made on the basis of the entries in the routing table. Such an illustrative routing table is shown in FIG. 5. This routing table uses the information from both the local topology table illustrated in FIG. 2 and the location table illustrated in FIG. 3, along with the above-described routing calculations (e.g., equation (3)). Using the same example above, and as illustrated in FIG. 5, a packet received at node 105 and destined for node 205 is routed to node 130 according to the routing table entry.

As described above, each node has its own local topology. A method for constructing such local topologies is described below.

As noted above, $S^k(v)$ is a k-neighborhood of a node, i.e., the set of nodes that are within k hops of that node. The following additional definition is made:

$R^k(v)$—the k-region of a node v, which is the set of points in the two dimensional plane that are closer to node v than to any other node in $S^k(v)$.

Figure 6:
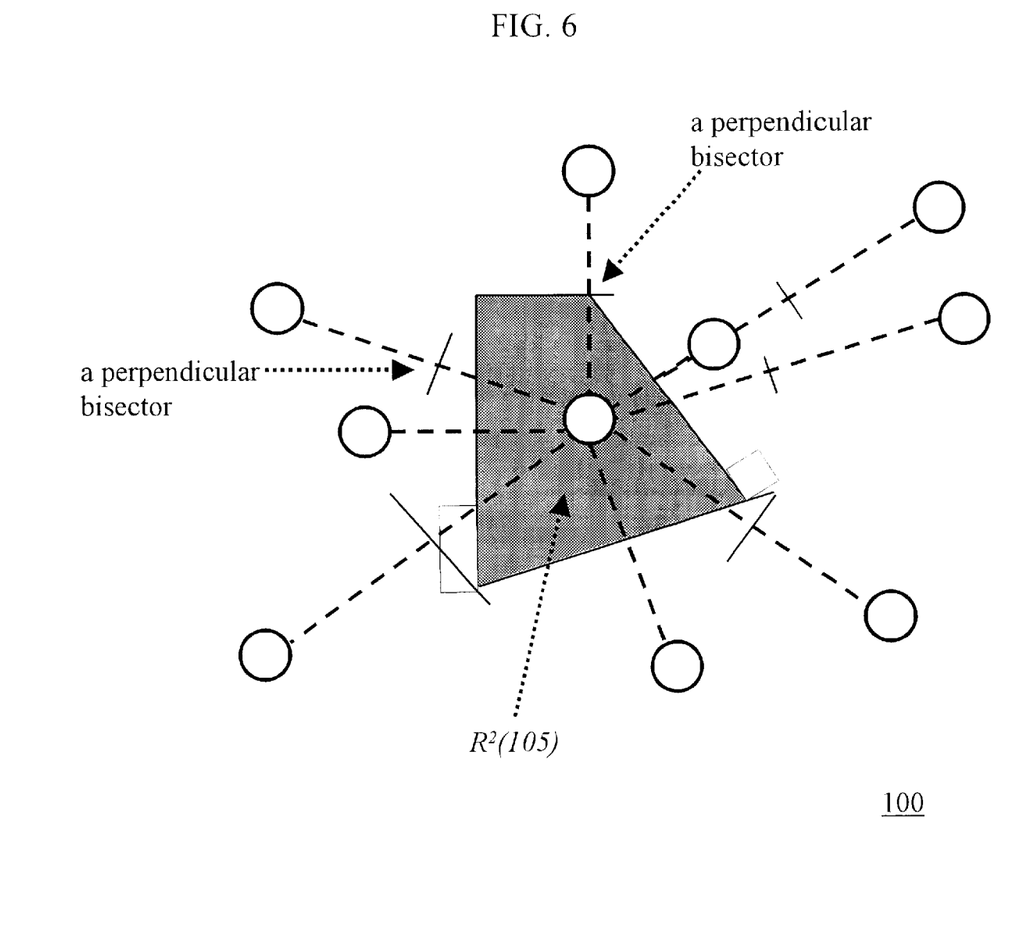
FIG. 6 shows an illustrative 2-region for node 105 of FIG. 1.

Note that $R^k(v)$ is constructed as follows. Assume that all nodes are positioned at their respective locations on the plane. Draw a straight line joining node v to some node $u \in S^k(v)$. Construct the perpendicular bisector of this line. This perpendicular bisector represents a half plane where node v lies in one half space. Let this half space be represented by $P_{vu}$. Note that if node $w \in P_{vu}$, then w is closer to v than to u. This process of constructing $P_{vu}$ is repeated for every $u \in S^k(v)$, and $R^k(v)$ is the intersection of the half-spaces. It can be shown that there is loopless delivery of packets using GRA if, and only if, there is no node $v \in V$ for which there exists a $w \in V$ such that $w \in R^k(v)$. An illustrative example of a k-region for node 105 of FIG. 1 is shown in FIG. 6, which in this example is a 2-region, $R^2(105)$. Given this condition, a flow chart of a method for use in a node for computing a local topology is shown in FIG. 7.

Figure 7:
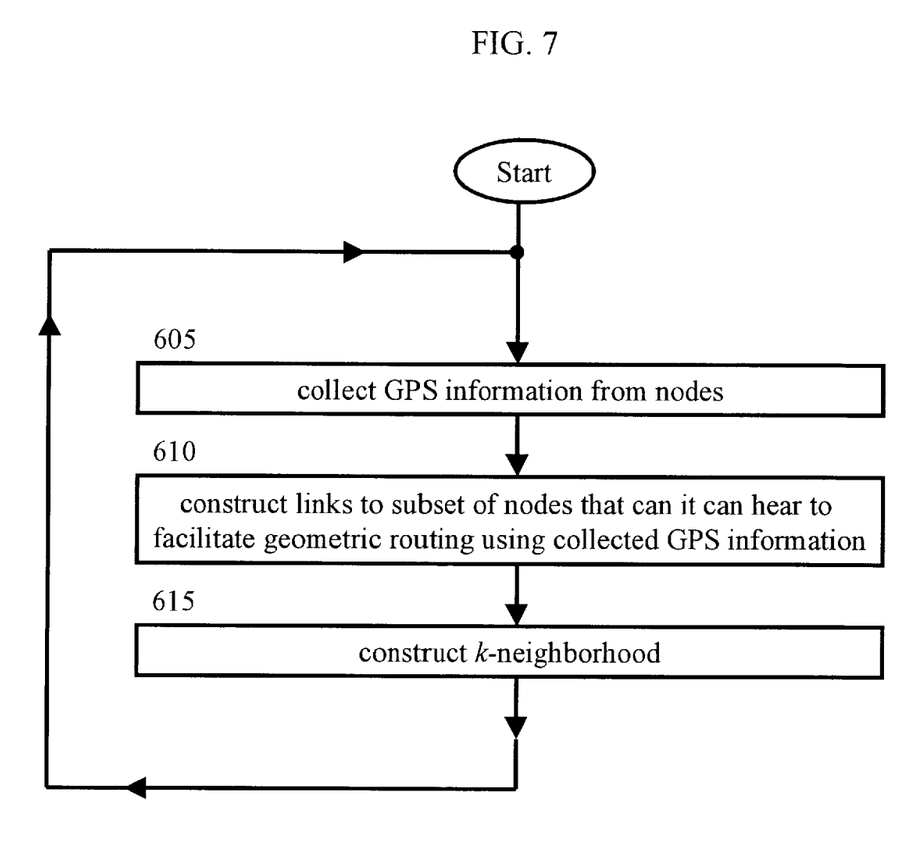
FIG. 7 shows an illustrative flow chart for use in constructing a local topology.

It is assumed that each node of the ad-hoc network performs the method of FIG. 7 every second to continually update, or create, its local topology anew. (Faster, or slower rates may be used depending on the mobility of the nodes of the ad-hoc network.) At a high level, each node first constructs point-to-point links to a subset of nodes within hearing distance using location information—thus, determining its direct neighbors (represented by steps 605 and 610). Then, each node propagates its direct neighbor information through limited flooding to enable each node to construct its k-neighborhood, $S^k(v)$, for a predefined value of k as represented by step 615. (As noted above, it is presumed that each node uses the same value of k.) Thus, a local topology is formed for a reference node.

Figure 8:
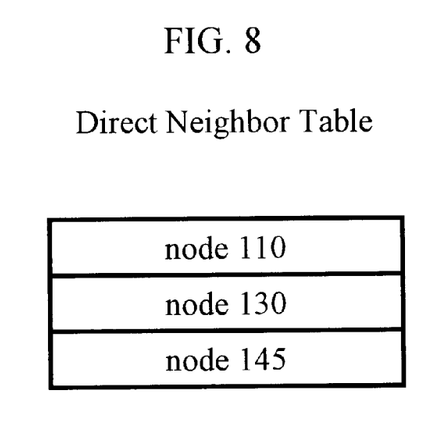
FIG. 8 shows an illustrative direct neighbor table.

In particular, each node uses a topology sensing scheme in step 605. In this topology sensing scheme, each node periodically (or continually) broadcasts an omnidirectional pilot signal modified to additionally convey location information to any node within its transmission radius, r. (As noted above, it is assumed that two dimensional GPS coordinates are provided by each transmitting node and it is these two dimensional GPS coordinates additionally transmitted in the pilot signal.) In the context of step 605, each node listens for pilot signals transmitted by other nodes within hearing distance and recovers the GPS information for each received pilot signal for storage in a table such as the location table of FIG. 3. Thus, in step 605 each node collects GPS information for potential neighboring nodes. (Although the particular form of the omnidirectional pilot signal is not necessary for the inventive concept, for those readers interested, an illustrative omnidirectional pilot signal is described in the above-referenced, co-pending, commonly assigned, U.S. Patent application of Ahmed et al., entitled "A Topology Sensing Scheme for Networks with Mobile Nodes.") In step 610, each node applies computational geometry to the collected GPS information to select those surrounding nodes that facilitate geometric routing and sets up point-to-point links with the selected nodes (becoming direct neighbors) and forms a direct neighbor table. (An illustrative direct neighbor table is shown in FIG. 8 for node 105 of FIG. 1.) Illustratively, there are at least three ways a node can construct its direct neighbor table using the collected GPS information.

Construction One:
Nodes $u \in V$ and $v \in V$ form a link if and only if there exists a circle with u and v on the circumference that does not contain any other node $w \in V$.

Construction Two:
Nodes $u \in V$ and $v \in V$ form an edge if and only if there exists a circle with u and v on the diameter that does not contain any other node $w \in V$.

Construction Three:

Nodes u∈V and v∈V form an edge if and only if the intersection of the circles with radius $D_{uv}$, one centered at u and one centered a v does not contain any other nodes w∈V.

It can be shown that if any of these three constructions is not connected, then no connected network can be formed. Construction One results in a network that is 1-routable. In other words, the network constructed by construction one results in a network where the local neighborhood of any node is the set of nodes that are directly connected to it. If GRA is used to route on this network where the local neighborhood is the 1-neighborhood, then any node can send packets to any other node. Network constructions two and three result in sparser networks (the number of links is lower than construction one). From simulation experiments, it can be shown that these networks are also almost k-routable, e.g., for k=2, or k=4.

After forming links with those nodes within hearing distance that meet one of the above-described criteria, each node through limited flooding propagates its link information (i.e., its direct neighbor table) to enable all nodes to construct their k-neighborhood in step 615. (Again, it is assumed that all nodes use the same value of k.) For example, and referring briefly back to FIG. 1, for a 2-neighborhood, node 105 receives the direct neighbor lists from nodes 110, 130 and 150 to construct the local topology table of FIG. 2. (It can be observed from FIGS. 1 and 2 that since node 125 was the direct neighbor to node 130, a packet received at node 105 and destined for node 125 is routed by node 105 to node 130.) Similarly, if k was equal to three, then direct neighbor information is further propagated through limited flooding (e.g., node 105 would also receive the direct neighbor tables of nodes 115, 120, 125, 135, 140 and 150). For example, node 105 transmits its direct neighbor table along with a "time-to-live" field. The value of the time-to-live field is used to flood, or propagate, the direct neighbor table information of node 105 to a limited neighborhood. Each node that receives the "time-to-live" field and the direct neighbor table of node 105, decrements the value of the "time-to-live" field. As long as the value of the "time-to-live" field is greater than zero, that receiving node further transmits the direct neighbor table of node 105 to its direct neighbors (with the decremented value of the "time-to-live" field). However, when the value of the "time-to-live" field reaches zero, that receiving node does not further propagate the direct neighbor table of 105. Although not described herein, it can be mathematically shown that the above described methods for creating a local topology generate no loops in the routing.

As noted above, it was assumed that each node knows the location (exact, or approximate) of all other nodes within a transmission radius, r. However, as noted above, it may be the case that a node is outside of the transmission range of a distant node and, therefore, cannot receive location information from that distant node. Although one alternative is simply to drop packets if the location of the distant node is not found, an alternative location update mechanism can also be used. For example, a lazy update mechanism may be used in which position information is periodically updated.

Figure 9:
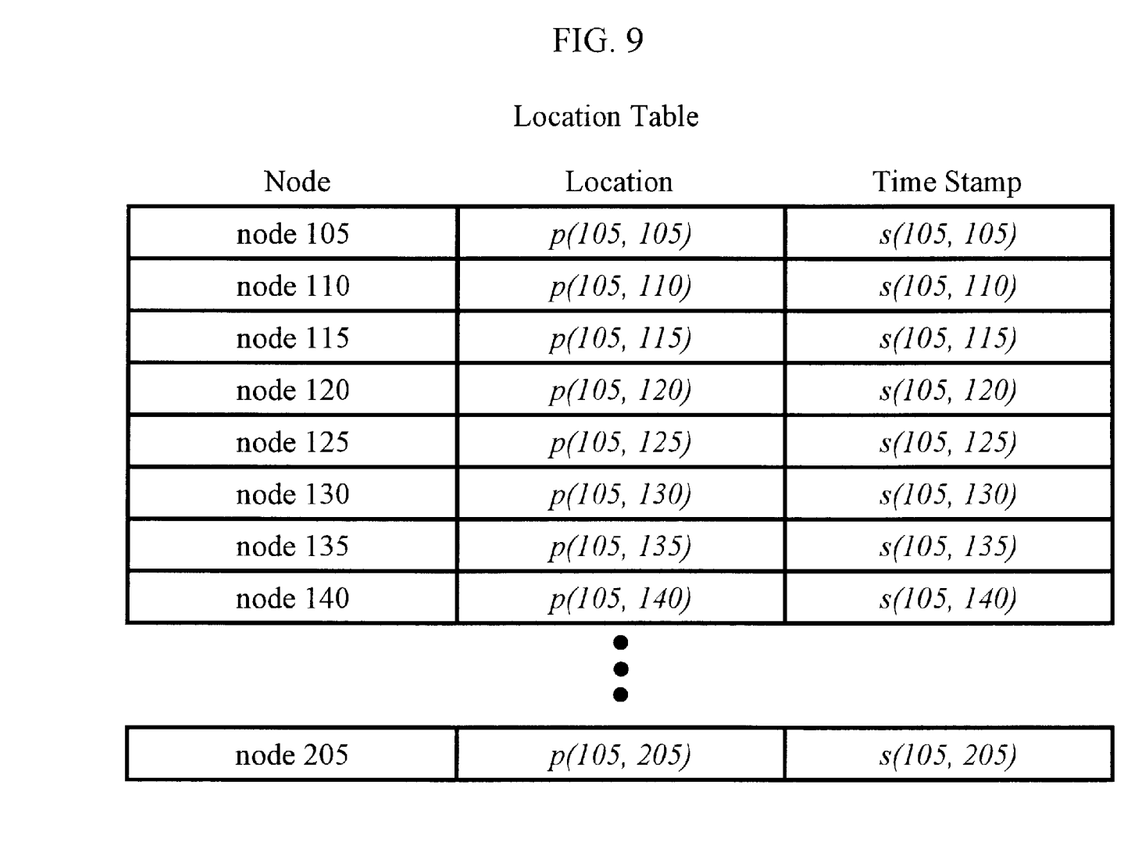
FIG. 9 shows another illustrative location table.

In this lazy update mechanism, each node maintains a list of the locations of all known nodes along with a time stamp as to when that information was generated by those nodes. Let p(i, k) be the position of node k as "seen" by node i and s(i, k) be a "time-stamp" at which the positional information was generated at node k. The time-stamp provides a vehicle for determining the age of the position information. (As can be observed from the discussion above, p(i, k) is a variation of l(v) and is two dimensional GPS information. Illustratively, s(i, k) is an integer value determined as a function of the month, day, year and time-of-day (using a 24 hour clock, e.g., 3:00 PM is 1500 hours).) The location table of FIG. 3 is modified to include the time-stamp field as shown in FIG. 9, where the reference node, i, is node 150 of FIG. 1. For completeness, the table of FIG. 9 includes entries for node i itself (here, represented by node 150). This list of position and timestamps at a node i, is referred to as the location list, or location table, L(i), at node i.

Figure 10:
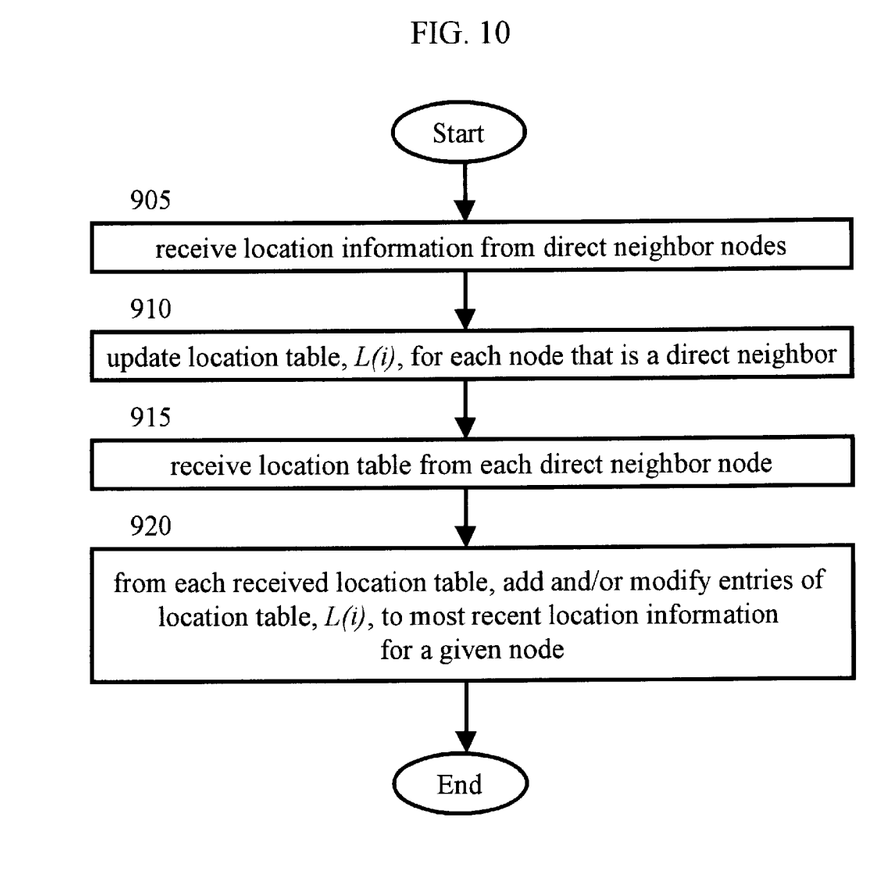
FIG. 10 shows an illustrative flow chart for use in a lazy update procedure.

In accordance with the lazy update method, each node periodically transmits its position to its direct neighbors (or, alternatively, to all nodes in its local topology) once every $t_1$ seconds. Further, once every $t_2$ seconds, each node transmits its location list L(i) to its direct neighbors (nodes within one hop). A flow chart of a lazy update method is shown in FIG. 10 for use in a receiving node, j. Let the receiving node j be a direct neighbor of node i. In step 905, the receiving node, j, receives location information p(i, k) from all nodes that are its direct neighbors. In step 910, receiving node j, updates its location list L(j) to reflect the current position and time-stamp for its direct neighbor nodes. (At this point it is presumed that the time-stamp information is more recent than previous local topology location transmissions stored in L(j).) In step 915, node j receives the location lists, L(i)s, from direct neighbor nodes. In step 920, node j adds and/or modifies entries in its location list L(j) by performing the following computation for each node k∈V listed on each of the received location lists (effectively "merging" the various location lists):

If s(i, k)>s(j, k) then s(j, k)=s(i, k) and p(j, k)=p(i, k);
Else,
   do nothing.

Also, if node j receives from a node a time-stamp associated with a node, k, not on its location list, then, by definition, s(i, k)>s(j, k), and node j adds this new node, k, to its location list. Similarly, node j updates location information for a node, i, already listed on its location list if the received time stamp from a particular location list is more current than the existing time-stamp, i.e., s(i, k)>s(j, k). On the other hand, if node j has more current information for a particular node k, i.e., s(i, k)≦s(j, k), then no change to the location list is performed. Thus, location information is gradually propagated throughout the ad-hoc network by the transmission of location lists from one node to its direct neighbors. This lazy update procedure results in significantly less routing overhead than flooding the entire network with the position information, whenever the position information changes significantly.

As can be observed from the above, there is a certain "warm-up" time for the ad-hoc network when using a lazy update mechanism during which some nodes will not have any information about distant nodes. As noted above, one option for the GRP routing method is to simply discard packets if the location to a distant node is not yet known.

Also, it should be noted that it is possible for a loop to occur using a lazy update mechanism. For example, let t be the destination node for a given packet, and let node v receive this packet from a node u. If node v determines that the next hop for the packet is u, this results in a loop. In order to avoid this, when this situation happens, nodes u and v exchange p(u, t), p(v, t), s(u, t) and s(v, t). The location of node t is resolved in favor of the node that has the more recent information. Both the nodes use this piece of information. With this modification, it can be shown that there can be no infinite loops in the route.

Figure 11:
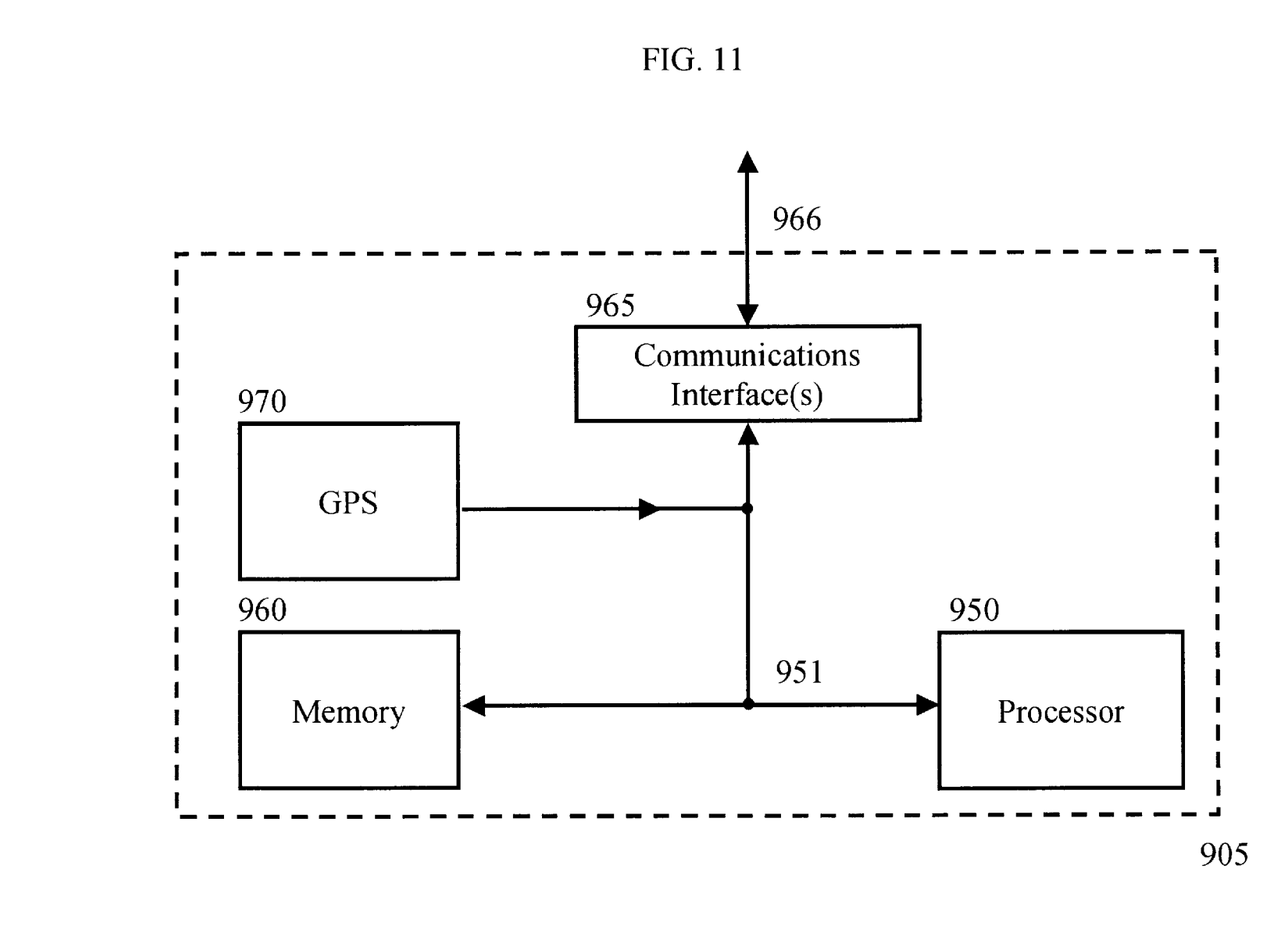
FIG. 11 shows an illustrative high-level block diagram of a node for use in the ad-hoc network of FIG. 1.

Turning briefly to FIG. 11, a high-level block diagram of a representative node 905 for use in the ad-hoc network of FIG. 1 is shown. Node 905 is a stored-program-control based processor architecture and includes processor 950; memory 960 (for storing program instructions and data, e.g., for communicating in accordance with the above-mentioned geometry-based routing protocol and storing location tables, etc.); communications interface(s) 965 for communicating with other nodes of the ad-hoc network via communication facilities as represented by path 966; and GPS element 970 for receiving GPS location information. Node 905 is also referred to as a router.

As described above, the inventive concept present a simple routing protocol to route packets in ad-hoc networks—large or small. The foregoing merely illustrates the principles of the invention and it will thus be appreciated that those skilled in the art will be able to devise numerous alternative arrangements which, although not explicitly described herein, embody the principles of the invention and are within its spirit and scope. For example, although the GRP identifies the closest node to a distant node, the GRP could be modified to identify any node that is closer to the distant node than the reference node. Also, although described in the context of a wireless application, the GRP could be used in other forms of packet networks such as wired networks, or networks that have combinations of wired and wireless links.

What is claimed is:

1. A routing method for use in a packet network, the routing method comprising the steps of:

receiving a packet for transmission to a destination node; and using a geometry-based routing protocol to route the packet to the destination node, the geometry-based routing protocol comprising:

calculating distances between a source node and a plurality of local area nodes;

calculating distances between the destination node and each of the plurality of local area nodes;

determining if the destination node is in a local area of nodes;

identifying a local area node closer to the destination node than the source node based on the calculated distances between the destination node and each of the plurality of local area nodes when the destination node is not in the local area of nodes; and routing the packet on a path to the identified local area node without including at least one of the plurality of local area nodes.

2. The routing method of claim 1 wherein the routing step further includes sending the packet to a next hop node of the plurality of local area nodes on the path to the identified local area node.

3. The routing method of claim 1 wherein the using step further comprises the steps of:

storing a local topology table comprising a list of nodes that are in a local area of a source node;

storing a location table comprising location information about nodes of the packet network;

wherein the determining if the destination node is in a local area of nodes is based on a determining if the destination node is listed in the local topology table; and wherein the identifying step is further based on the location table to identify one of the list of nodes in the local area that is closer to the destination node than the source node.

4. The routing method of claim 1 wherein the using step further comprises the steps of:

storing a local topology table comprising a list of nodes that are in a local area of a source node;

storing a location table comprising location information about nodes of the packet network;

for a node of the packet network outside of the local area, the identifying step is further based on the location table to identify one of the list of nodes in the local area that is closer to the node outside of the local area;

storing a routing table, wherein the routing table comprises at least an association between the node outside of the local area and a next hop node from the local area, where the next hop node is on a path to the identified local area node; and wherein the routing step uses the routing table to route the packet.

5. A routing method for use in a packet network, the routing method comprising the steps of:

receiving a packet for transmission to a destination node; and when the destination node is outside of a local node topology, routing the packet to the destination node as a function of distance to the destination node, by:

calculating distances between a source node and a plurality of local area nodes;

calculating distances between the destination node and the plurality of local area nodes;

determining if a node in the local node topology is closer to the destination node than the source node based on the calculated distances between the destination node and each of the plurality of local area nodes when the destination node is not in the local area of nodes; and routing the packet on a path to the determined node without including at least one of the plurality of local area nodes.

6. The method of claim 5 wherein the routing step further includes sending the packet to a next hop node of the plurality of local area nodes on the path to the determined node.

7. A routing method for use in a packet network, the routing method comprising the steps of:

receiving, in a source node, a packet for transmission to a destination node;

selecting a node as a function of distance to the destination node such that the selected node is closer to the destination node than the source node, the function including:

calculating distances between a source node and a plurality of local area nodes; and calculating distances between the destination node and each of the plurality of local area nodes, and routing the packet on a path to the selected node without including at least one of the plurality of local area nodes.

8. A routing method for use in a packet network, the routing method comprising the steps of:

receiving, in a source node, a packet for transmission to a destination node;

selecting a node as a function of distance to the destination node such that the selected node is closer to the destination node than the source node, the function including:

calculating distances between the source node and a plurality of local area nodes; and calculating distances between the destination node and each of the plurality of local area nodes; and sending the packet to a next hop node on a path to the selected node without including at least one of the plurality of local area nodes.

9. Apparatus for use in a node of a packet network, the apparatus comprising:

a global positioning system receiver for determining location information of the node; and a processor that implements a geometry-based routing protocol for routing packets to distant nodes such that the processor uses location information received from a plurality of local area nodes to select an identified node that is closest to one of the distant nodes, calculates distances between the node and the plurality of local area nodes, and calculate calculates distances between the destination one distant node and each of the plurality of local area nodes, the selecting based on the calculated distances between the one distant node and each of the plurality of local area nodes.

10. The apparatus of claim 9 further comprising:

a global position system receiver configurable to determine location information of the node.

11. The apparatus of claim 9 wherein the processor further routes packets to the selected node for further transmission to the distant node.

12. The apparatus of claim 9 wherein the processor further drops packets to the distant node if the node is also the selected node.

13. Apparatus for use in a node of a packet network, the apparatus comprising:

a processor that implements a geometry-based routing protocol for routing packets to distant nodes such that that processor uses location information received from a plurality of local area nodes to select a selected node that is closer to one of the distant nodes, calculates distances between the node and the plurality of local area nodes, calculates distances between the one distant node and each of the plurality of local area nodes, the selecting based on the calculated distances between the one distant node and each of the plurality of local area nodes, wherein the processor sends the packet to a next hop node on a path to the selected node.

14. The apparatus of claim 13 further comprising:

a global position system receiver configurable to determine location information of the node.

15. Apparatus for use in a first node of a packet network, the apparatus comprising:

a memory for storing (a) a local topology table comprising a list of nodes that are in a local area of the first node, and (b) a location table comprising location information about nodes of the packet network; and a processor for routing a received packet to a destination node by determining if the destination node is listed in the local topology table, and, if the destination node is not in the local area of nodes, using the location table to: identify one local area node of the list of nodes in the local area that is closer to the destination node than the first node, calculate distances between the first node and a plurality of local area nodes and calculate distances between the destination node and the plurality of local area nodes, and route the received packet to the identified local area node, the processor identifies the identified local area node based on the calculated distances between the distant node and each of the plurality of local area nodes.

16. Apparatus for use in a first node of a packet network, the apparatus comprising:

a memory for storing (a) a local topology table comprising a list of nodes that are in a local area of the first node, (b) a location table comprising location information about nodes of the packet network, and (c) a routing table; and a processor for (a) using the location table to identify one of the list of nodes in the local area that is closer to a node of the packet network outside of the local area than the first node, in part by calculating distances between a source node and a plurality of local area nodes, and calculating distances between the destination node and the plurality of local area nodes, (b) creating an entry in the routing table that associates the node outside of the local area with a next hop node from the local area, where the next hop node is on a path to the identified local area node, and (c) routing a received packet to a destination node by using the routing table, wherein at least one of the nodes of the list of nodes is not on a path to the destination node.

17. An improved node for use in routing packets to a destination node of a packet network, the improvement comprising:

a router that routes packets to the destination node by determining if the destination node is in a local area of nodes such that if the destination node is not in the local area of nodes, the router identifies a local area node closer to the destination node than the improved node, in part by calculating distances between the improved node and a plurality of local area nodes and calculating distances between the destination node and the plurality of local area nodes, and routes the packet to the identified local area node without including at least one of the plurality of local area nodes.

18. An improved node for use in routing packets to a destination node of a packet network, the improvement comprising:

a router that routes packets to the destination node by determining if the destination node is in a local area of nodes such that if the destination node is not in the local area of nodes, the router identifies a local area node closer to the destination node than the improved node, in part by calculating distances between the improved node and a plurality of local area nodes and calculating distances between the destination node and the plurality of local area nodes, and sends the packet to a next hop node on a path to the identified local area node without including at least one of the plurality of local area nodes.

* * * * *